US006575817B2

United States Patent
Czech

(10) Patent No.: US 6,575,817 B2
(45) Date of Patent: Jun. 10, 2003

(54) PROCESS FOR TREATING THE INTERIOR OF A HOLLOW COMPONENT

(75) Inventor: Norbert Czech, Dorsten (DE)

(73) Assignee: Siemens Aktiengesellschaft, Munich (DE)

( * ) Notice: Subject to any disclaimer, the term of this patent is extended or adjusted under 35 U.S.C. 154(b) by 212 days.

(21) Appl. No.: 09/814,491

(22) Filed: Mar. 21, 2001

(65) Prior Publication Data

US 2001/0018319 A1 Aug. 30, 2001

Related U.S. Application Data

(63) Continuation of application No. PCT/DE99/02856, filed on Sep. 9, 1999.

(30) Foreign Application Priority Data

Sep. 21, 1998 (DE) .......................................... 198 43 169

(51) Int. Cl.⁷ .............................................. B24B 31/00
(52) U.S. Cl. ................................ 451/61; 451/36; 134/8
(58) Field of Search ............................. 451/61, 36, 29, 451/104, 113; 134/3, 7, 8

(56) References Cited

U.S. PATENT DOCUMENTS

| 2,948,092 A | 8/1960 | Fuller | |
|---|---|---|---|
| 3,833,414 A * | 9/1974 | Grisik et al. | 134/3 |
| 4,339,282 A | 7/1982 | Lada et al. | |
| 4,439,241 A | 3/1984 | Ault et al. | |
| 4,716,433 A | 12/1987 | Lee et al. | |
| 6,174,448 B1 * | 1/2001 | Das et al. | 134/7 |
| 6,194,026 B1 * | 2/2001 | Warnes et al. | 134/7 |
| 6,217,668 B1 * | 4/2001 | Czech et al. | 134/7 |

FOREIGN PATENT DOCUMENTS

| EP | 0 525 545 B1 | 3/1997 |
|---|---|---|
| EP | 0 761 386 A1 | 3/1997 |
| WO | WO 97/05299 | 2/1997 |

* cited by examiner

*Primary Examiner*—Robert A. Rose
(74) *Attorney, Agent, or Firm*—Laurence A. Greenberg; Werner H. Stemer; Ralph E. Locher

(57) ABSTRACT

A process for machining the interior of a hollow component for high-temperature application is described. The component has a base body made from a base material, and is in particular a blade of a gas turbine. The component has a cavity, in particular cooling channels for cooling air to flow through, which is provided with an internal coating. According to the process, a treating fluid flows through the cavity, solid particles with an abrasive action being added to the treating fluid.

11 Claims, 2 Drawing Sheets

PROCESS FOR TREATING THE INTERIOR OF A HOLLOW COMPONENT

CROSS-REFERENCE TO RELATED APPLICATION

This application is a continuation of copending International Application No. PCT/DE99/02856, filed Sep. 9, 1999, which designated the United States.

BACKGROUND OF THE INVENTION

1. Field of the Invention

The invention relates to a process for treating the interior of a hollow component for a high-temperature application, having a base body made from a base material, which component has a cavity with an internal coating.

International Patent Disclosure WO 97/05299 describes a product, in particular a gas-turbine component such as a turbine blade, with a metallic base body in which cooling channels are made. The metallic base body is in this case cast in hollow and thin-walled form from a material with a high temperature strength. This allows efficient cooling with a cooling medium, in particular cooling air, from the inside of the blade. The base body has at least one longitudinal cooling channel and a number of transverse cooling channels which branch off therefrom. On the hot-gas side of the blade, a coating is provided, which protects the metallic base body against oxidation and high-temperature corrosion from a hot gas flowing through the gas turbine. A further hot-gas-side coating of a ceramic material is applied to the corrosion-resistant layer in order to reduce the heat flux into the blade. The transverse cooling channels may be formed as perforations in the blade body or on a platform. The process results in a coating of the transverse channels without their cross section being narrowed in an uncontrolled manner. In the interior, the blade is provided with an enriching layer, which is configured as a diffusion layer, i.e. is formed as a result of a separately applied metal diffusing into the base body. It is preferable for aluminum, chromium and chromium-aluminum alloys to be used as a metal of this type.

European Patent EP 0 525 545 B1 describes a process for repairing a work piece made from a corroded superalloy or a corroded heat-resistant steel. In this case, corrosion products are present on the surface of the work piece, the surface being cleaned in order to remove a significant part of the corroded surface. Then, an aluminide layer is applied to the surface, extending sufficiently deeply for it to include substantially all the corrosion products that have remained after the cleaning. The aluminide layer is removed again together with the corrosion products. This process only relates to the repair of the outer surface of a work piece, in particular a gas turbine blade. The surface corrosion products are in this case removed by chemical and/or mechanical processes. Mechanical removal preferably takes places by abrasive blasting and chemical removal by the use of acid mixtures, hydrofluoric acid (aqueous solution of hydrogen fluoride) also being used.

U.S. Pat. No. 4,339,282 describes a method for removing aluminide coatings from a nickel superalloy which forms a turbine blade. The aluminide coating is removed by a chemical process using an acid mixture that substantially does not attack the nickel superalloy. The mixture used is a mixture of nitric acid ($HNO_3$) and hydrochloric acid (HCl) with iron chloride ($FeCl_3$) and copper sulfate ($CuSO_4$). This process is preferably used for nickel superalloys bearing the designations U-700, IN-100, MAR M-200 and B1900.

SUMMARY OF THE INVENTION

It is accordingly an object of the invention to provide a process for treating the interior of a hollow component that overcomes the above-mentioned disadvantages of the prior art methods of this general type, which treats an internal coating which is applied in the cavity.

With the foregoing and other objects in view there is provided, in accordance with the invention, a process for treating an interior of a hollow component used in high-temperature applications. The hollow component has a base body made from nickel-based alloys and/or cobalt-based alloys, the hollow component has a cavity and is lined by an internal coating. The method includes introducing a treating fluid flowing through the cavity, the treating fluid having solid particles with an abrasive action and the treating fluid abrades the internal coating. The treating fluid is an acidic, aqueous solution or an alkaline, aqueous solution.

In the process according to the invention, a treating fluid flows through the hollow cavity, and solid particles that have an abrasive action are added to the fluid, an internal coating in the cavity being abraded by the treating fluid.

This allows removal of the internal coating (stripping) without unacceptable attacks on the base material. The coating is removed by a mechanical process by the abrasive solid particles and the treating fluid can therefore have, if appropriate, only a weak chemical action with regard to the base material. As a result, the internal coating can be removed in a short time even if the aggressiveness and duration of action of the treating fluid are low, without significant attack on the base material. The process is particularly suitable for components that have been exposed to a high temperature, for example of over 1000° C., over a prolonged period of use. In a component of this type, the internal coating, which originally predominantly contained one substance, may, on account of thermally related transitions, have regions of a different chemical composition, in particular may have stable oxides. These oxides (fully oxidized regions of the internal coating) can be completely eliminated by the abrasive solid particles simultaneously with other regions of the internal coating which have not been fully oxidized. This allows recoating without problems and without flawed layer formations in the regions of oxide residues, so that the cavity can be recoated uniformly without undesirable changes to the cavity cross section, in particular without any obturation of the cavity. This is particularly advantageous especially for components that are exposed to high temperatures and are cooled by cooling fluid which is guided in cooling channels, since the process according to the invention ensures that flow can take place through the cooling channels after abrasion of the internal coating and recoating of the cooling channels.

Compared to purely chemical machining processes in which acid mixtures are used, with the process according to the invention it also becomes possible to treat an internal coating with regions which react differently to chemical reagents, in particular chemically resistant oxide regions and regions which can be eroded easily by a chemical process, for example with a high pure metallic content. With the process according to the invention, there is no need to use an aqueous solution of hydrogen fluoride (hydrofluoric acid), thus avoiding the risk of uncontrollable chemical intergranular attack on the base material.

Preferably, the treating fluid together with the solid particles with an abrasive action is passed in a circuit, with the result that the abrasive solid particles only need to be renewed when necessary. This considerably increases the economic viability of the overall process.

The treating fluid preferably contains an acidic, aqueous solution which is in particular free of hydrofluoric acid. The aqueous solution may in this case have an acid mixture of different acids as described, for example, in U.S. Pat. No. 4,339,282.

The treating fluid used may also be an alkaline, aqueous solution. It is also conceivable to use a gas that serves as a carrier gas for the abrasive solid particles as the treating fluid. However, the treating fluid is preferably a liquid or a mixture of different liquids that are selected according to the material of the internal coating and the base material. The abrasive solid particles used are particles that ensure sufficiently rapid abrasion of the most mechanically and/or chemically stable regions of the internal coating. The abrasive solid particles preferably are formed of corundum and/or silicon carbide. As a result, it is possible to reduce the required duration of action of a chemically active treating fluid. In particular, this leads to the removal of regions with a chemically resistant oxide, primarily aluminum oxide, within a short time. Particularly in the case of an internal coating that contains an aluminide, the aluminum oxide regions that form as a result of use at high temperatures and which are of a greater thickness than the aluminide regions are abraded more rapidly. Compared to the internal coating in the form of pure alitizing, the more voluminous aluminum oxide regions are abraded preferentially. The diameter of the solid particles (particle size) is preferably considerably smaller than the minimum diameter of the cavity, thus eliminating the risk of the cavity becoming blocked. The particle size is preferably smaller than the minimum diameter by one order of magnitude, i.e. is less than a tenth of the minimum diameter. The minimum diameter of a cavity, e.g. a cooling bore in a gas turbine blade, may be of the order of magnitude of 0.5 mm or more.

The treating fluid is preferably passed through the cavity at a predetermined velocity. This velocity can be determined in advance by experimentation or by simulation calculations. Considered locally, the velocity in individual cavities, e.g. cooling channels, bores in turbine blades, has a suitable value according to the type of component. It is also possible to adapt the velocity, when carrying out the process, according to the abrasion of the internal coating that has already taken place. It will be understood that the velocity can also be adapted to the type of abrasive solid particles and to the chemical composition of the treating fluid. In this case, the treating fluid is preferably pumped through the component, in which case it is possible to set the velocity by the pumping capacity of the pump. As a result, the desired cleaning action (abrasion of the internal coating) can be adjusted and undesirable abrasion of the base material can be drastically reduced.

The process is preferably carried out on a component of a turbomachine, in particular a gas turbine, such as a turbine blade or a heat shield element. A component of this type may in this case have a multiplicity of cavities that are configured as longitudinal and/or transverse channels. The cavities (channels) may in this case also be of different diameters and may be separated from one another in terms of fluid dynamics. While the component is being used as intended, the channels have, for example, a cooling fluid, in particular cooling air, flowing through them. In the process for treating the interior of a component, in this case the direction of flow of the treating fluid may be the same as the direction of flow of the cooling fluid or may be opposite to this direction of flow. In the case of channels (cavities) which are separated from one another in terms of fluid dynamics, the process can be carried out in such a way that a treating fluid flows through the channels separately from one another. In particular, it is possible, in the opposite direction to the direction of flow of the cooling fluid, first to treat a channel using a suitable flow velocity and a suitably selected treating fluid with abrasive solid particles and then to flow through one or more further channels with suitably adapted parameters.

The process is preferably carried out on a component with a base material made from a nickel-based and/or cobalt-based alloy (superalloy for high-temperature applications). Such base alloys are specified, for example, in U.S. Pat. No. 4,339,282 and European Patent EP 0 486 489 B1. These base alloys are suitable in particular for the production of components for high-temperature applications, for example in gas turbine construction.

The internal coating preferably contains an aluminum oxide ($Al_2O_3$) and/or an aluminide. The internal coating therefore has at least two regions with different chemical and mechanical properties. An internal coating of this type is present, for example, in components which are exposed to a high temperature, in which an initial internal coating was produced by alitizing and, as a function of the local component temperature in a hot section, some of the aluminide has been converted into aluminum oxide, and in a cooler section of the cavity it is still substantially aluminide which is present. As a result of the conversion of some of the aluminide into aluminum oxide, an oxidation-resistant and/or corrosion-resistant layer is formed with respect to a (cooling) fluid flowing inside the cavity while the component is in use. This occurs in particular in gas turbine blades in which an internal coating is produced from a nickel aluminide or cobalt aluminide in which aluminum is applied to a nickel-containing or cobalt-containing base material and diffuses into this material.

As an alternative or in addition, a preferred internal coating may contain chromium oxide and/or a chromide. It is also possible for an internal coating to be produced by the application of gallium, so that after the component has been used at a high temperature the internal coating contains gallium oxide and/or a gallide.

Preferably, after abrasion of the internal coating, the cavity (the cooling channels) is provided with a new internal coating. This results in an effective repair (refurbishment) of the component for renewed use at a high temperature.

Other features which are considered as characteristic for the invention are set forth in the appended claims.

Although the invention is illustrated and described herein as embodied in a process for treating the interior of a hollow component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
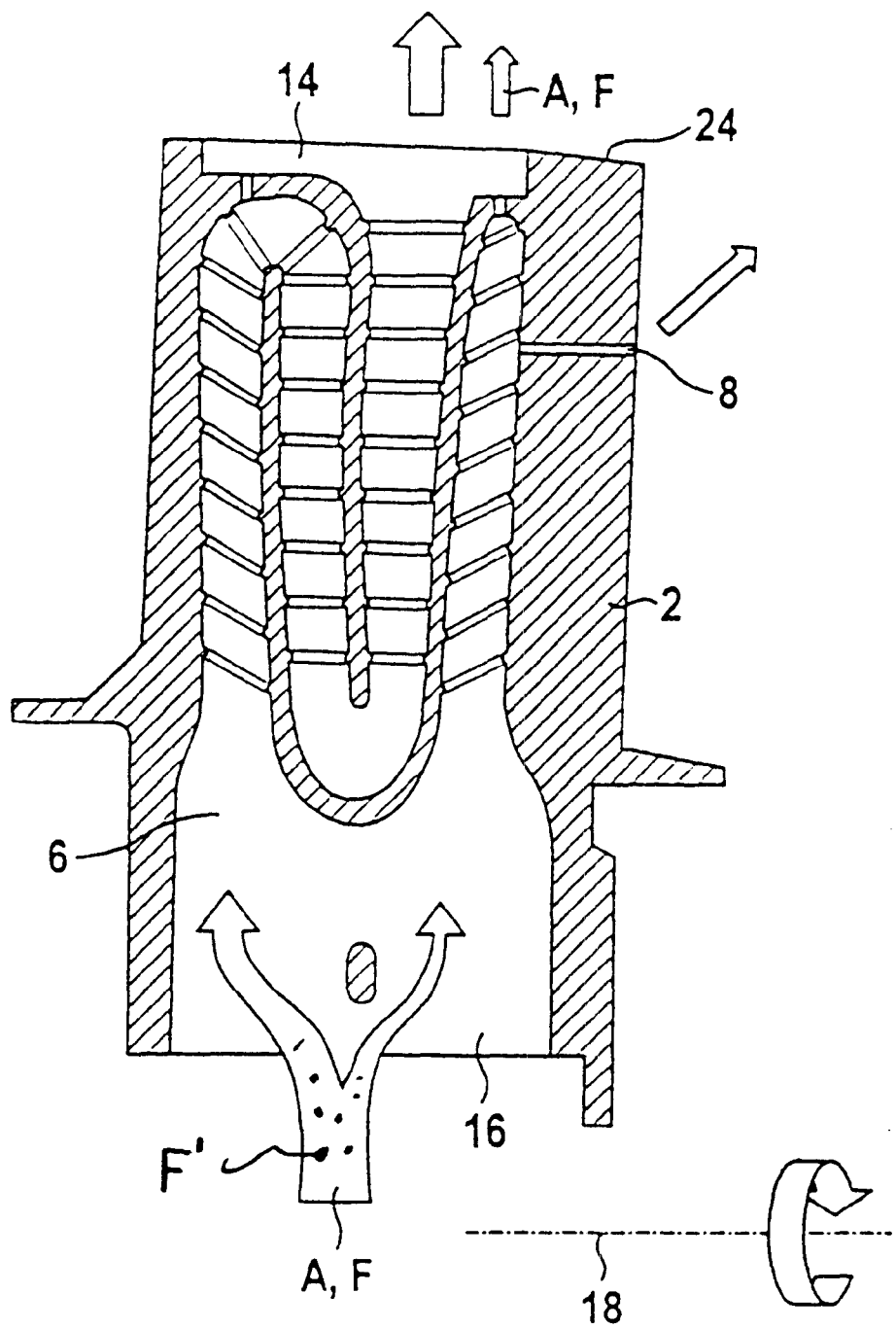
FIG. 1 is a diagrammatic, longitudinal sectional view through a rotor blade of a gas turbine.
Figure 2:
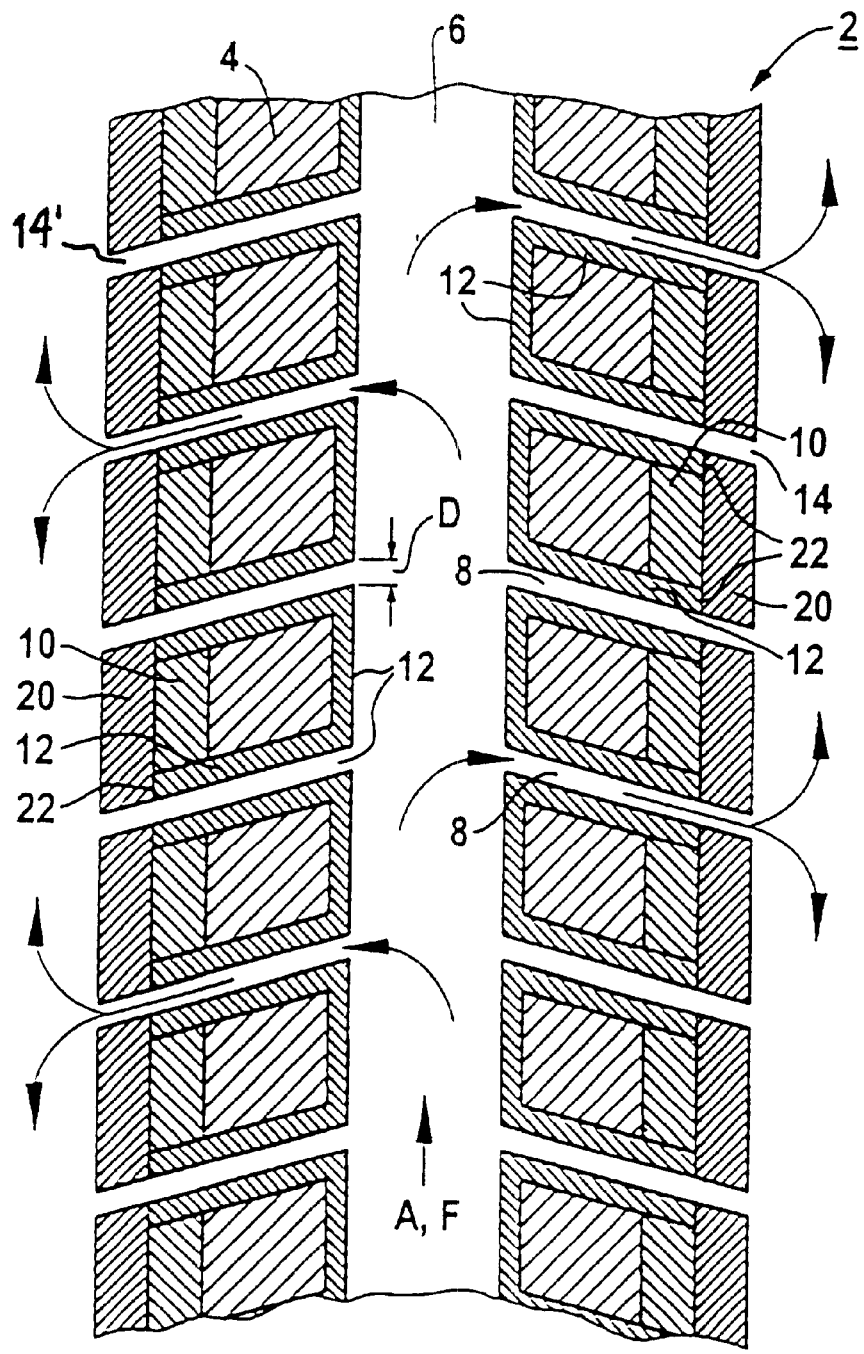
FIG. 2 is a detailed, longitudinal sectional view through the gas turbine blade with an outer thermal barrier coating.

In all the figures of the drawing, sub-features and integral parts that correspond to one another bear the same reference symbol in each case. Referring now to the figures of the drawing in detail and first, particularly, to FIG. 1 thereof, there is shown a component 2, in this case a rotor blade 2, of a gas turbine. While the gas turbine is operating, the rotor blade 2 rotates about a turbine axis 18. The rotor blade 2 has a cavity 6 that forms two longitudinal channels that are separated from one another in terms of fluid dynamics. The cavity 6 has an inlet opening 16, which faces toward the turbine axis 18, for cooling air A and an outlet opening 14, which is disposed at that end 24 of the rotor blade 2 which is remote from the axis 18. During normal use of the rotor blade 2, the cooling air A enters the cavity 6 through the inlet opening 16, where it is split into two part-streams, the larger part-stream being passed in serpentine form through the cavity 6 to the outlet opening 14. The smaller part-stream passes on the one hand to the outlet opening 14 and on the other hand to a multiplicity of transverse channels 8 (of which for the sake of clarity only one is illustrated) and out of the cavity 6. For internal treating, i.e. for abrasion of an internal coating of the cavity 6, a treating fluid F, which contains abrasive solid particles F', flows through the cavity 6 in the same direction of flow as the cooling air A. FIG. 2 shows a section through the blade 2, which is a guide vane or a rotor blade, for the gas turbine, having a metallic base body 4 made from a base material. A base material of the base body 4 may in particular be a nickel-based or cobalt-based superalloy. The longitudinal channel 6 is situated approximately centrally inside the base body 4. A number of the transverse channels 8 branch off from the longitudinal channel 6. While the blade 2 is being used in the gas turbine, the longitudinal channels 6 and the transverse channels 8 serve to guide through the cooling medium A, in particular cooling air. A covering layer 10 is applied directly to the outside of each side of the base body 4. The covering layer 10 preferably is formed of an alloy of the type MCrAlY or MCrAlRe. An alloy of this type can serve directly as a corrosion-resistant or oxidation-resistant layer and as an adhesion promoter layer for a thermal barrier coating 20. In the class of alloys for protective layers which are included under the collective term "MCrAlY alloy", M represents at least one of the elements selected from the group consisting of iron, cobalt and nickel, and Cr represents chromium, Al represents aluminum and Y represents yttrium. Alloys of this type are described, for example, in Published, European Patent Application EP 0 412 397 A1, European Patent EP 0 486 489 B1 and European Patent EP 0 397 731 B1. In a MCrAlRe alloy, Re represents rhenium and M, Cr and Al represent the same elements as in the MCrAlY alloys. The covering layer 10 preferably has a thickness of from 180 µm to 300 µm. Toward the outside, the transverse channels 8 each have an outlet opening for the cooling medium A that are not covered by the covering layer 10. The covering layer 10 is preferably applied by a low-pressure plasma spraying process or a vacuum plasma spraying process. It fulfils the function of an outer protective layer.

An internal coating 12 is provided in the longitudinal channel 6 and the transverse channels 8, and in the transverse channels 8 the internal coating 12 also covers part of the covering layer 10. The internal coating 12 was produced as an enriching layer with a thickness of from 30 µm to 100 µm before the blade 2 was used in a gas turbine. It is preferably applied by a diffusion process, during which chromium, aluminum and/or gallium are applied by vapor deposition and diffused in.

The thermal barrier coating 20 can be a ceramic thermal barrier coating 20 provided on the outside of the covering layer 10, leaving uncovered the outlet openings 14' of transverse channels 8. The thermal barrier coating 20 has a thickness of from 100 µm to 500 µm, preferably a thickness of from 200 µm to 300 µm. It may be formed of one of the conventionally known materials, such as yttrium-stabilized zirconia. While leaving clear the outlet openings 14, 14', the thermal barrier coating 20 covers both the covering layer 10 and, in a small part known as an overlap region 22, the internal coating 12. The thermal barrier coating 20 may be applied by an atmospheric plasma spraying (APS) process or by a physical vapor deposition (PVD) process.

The blade 2 therefore has an internally coated longitudinal cooling channel 6 and a number of internally coated transverse cooling channels 8 that branch off from the longitudinal cooling channel 6, through which passages the coolant A flows. While the blade 2 is operating in the gas turbine at a high temperature of, for example, over 1000° C., some of the aluminide is converted into aluminum oxide depending on the local component temperature, which corresponds to the active principle of a protective layer. In contrast, in cooler regions of the cooling channels 6, 8, the internal coating may still to a large extent be in the form of aluminide even after prolonged operating periods. During reworking of the component 2, i.e. the blade 2, after completion of an operating period, it is therefore necessary to remove the internal coating 12 (stripping).

To do this, the treating fluid F having the solid particles F' with an abrasive action flows through the longitudinal channel 6 and, branching off from the longitudinal channel 6, in the transverse channels 8, in the direction of flow of the cooling medium A, in a flow-through process, preferably in a continuous circuit. By use of the abrasive solid particles F', in particular particles F' of corundum and/or silicon carbide, the regions which are rich in aluminum oxide and are more voluminous than the aluminide regions which are still present are preferentially abraded. For its part, the treating fluid F is chemically reactive, so that it serves to remove the aluminide regions which are still present without significantly attacking the base material. The flow through the longitudinal channel 6 and the transverse channels 8 takes place at a velocity that is such that the desired cleaning action is achieved without significant abrasion of the base material. The size of the solid particles F' is in this case selected in such a way that obturation (blockage) of the transverse channels 8, which define a minimum diameter of all the channels (cavities) 6, 8, could not occur. In this case, the diameter of the solid particles F' is preferably less than one tenth of the diameter D of the transverse channels 8. After the internal coating 12 has been abraded by the process, and if appropriate the covering layer 10 and the thermal barrier coating 20 have also been removed by suitable processes, such as abrasive blasting or wet chemical processes, the internal coating 12 is produced again by alitizing, or by the application of chromium and/or gallium, and in this way the blade 2 is restored for renewed use in the gas turbine.

I claim:

1. A process for treating an interior of a hollow component used in high-temperature applications, the hollow component having a base body made from at least one base material selected from the group consisting of nickel-based alloys and cobalt-based alloys, the hollow component having a cavity formed therein and lined by an internal coating, which comprises the steps of:

selecting a treating fluid from the group consisting of an acidic, aqueous solution and an alkaline, aqueous solution;

providing the treating fluid with solid particles having a mechanical abrasive action;

introducing the treating fluid flowing through the cavity, leading to a chemical stripping of the internal coating; and abrading the internal coating with the treating fluid by chemical and mechanical processes concurrently during the whole treatment.

2. The process according to claim 1, which comprises recirculating continuously the treating fluid through the cavity.

3. The process according to claim 1, which comprises providing the acidic, aqueous solution to be free of hydrofluoric acid.

4. The process according to claim 1, which comprise using a material selected from the group consisting of corundum, silicon carbide and a compound of corundum and silicon carbide as the solid particles with the abrasive action.

5. The process according to claim 1, which comprises providing the solid particles with a diameter of less than one tenth of a minimum diameter of the cavity.

6. The process according to claim 1, which comprises passing the treating fluid through the cavity at a predetermined velocity.

7. The process according to claim 1, which comprises performing the process on one of turbine blades and heat shield elements.

8. The process according to claim 1, which comprises performing the process on the hollow component having the internal coating selected from the group consisting of aluminum oxide, an aluminide, and a compound formed of aluminum oxide and aluminide.

9. The process according to claim 1, which comprises performing the process on the hollow component having the internal coating selected from the group consisting of chromium oxide, chromide, and a compound formed of chromium oxide and chromide.

10. The process according to claim 1, which comprises performing the process on the hollow component having the internal coating selected from the group consisting of gallium oxide, gallide, and a compound formed of gallium oxide and gallide.

11. The process according to claim 1, which comprises after the abrading of the internal coating, recoating the cavity with a new internal coating.

* * * * *